United States Patent [19]
Hopkins

[11] 3,990,875
[45] Nov. 9, 1976

[54] METHOD FOR MAKING FUSED FIBER ENERGY-CONDUCTING DEVICES

[75] Inventor: Ethan C. Hopkins, South Woodstock, Conn.

[73] Assignee: American Optical Corporation, Southbridge, Mass.

[22] Filed: Dec. 23, 1966

[21] Appl. No.: 604,455

[52] U.S. Cl. .................................. 65/4 B; 65/319; 65/320; 65/DIG. 7
[51] Int. Cl.² .......................................... C03B 23/20
[58] Field of Search ......... 65/4 B, 320, 319, DIG. 7; 18/16.5, 16.7

[56] References Cited
UNITED STATES PATENTS

| | | | |
|---|---|---|---|
| 2,992,516 | 7/1961 | Norton | 65/4 |
| 3,150,413 | 9/1964 | Zeitlin et al. | 18/16.5 |
| 3,224,851 | 12/1965 | Hicks | 65/4 |
| 3,226,589 | 12/1965 | Woodcock | 313/475 |
| 3,350,743 | 11/1967 | Ishizuka | 18/16.5 |

*Primary Examiner*—Richard D. Lovering
*Attorney, Agent, or Firm*—H. E. Berkenstock, Jr.; William C. Nealon

[57] ABSTRACT

Method of making fused bundles of glass fibers permanently vacuum tight with the application of a high compressive force upon the bundles by heating the bundles while under the compressive force and in an evacuated environment to a temperature substantially higher than the softening points of the glasses of the bundles and, in each case, holding the higher temperature and compressive force substantially constant for a time sufficient to attain thermal equilibrium in the bundle whereby permanence of vacuum tightness is attained. Thereafter, the temperature of the bundle is lowered to below the softening points of its glasses, the compressive force is released and the bundle is annealed followed by cooling to room temperature.

4 Claims, 9 Drawing Figures

U.S. Patent   Nov. 9, 1976   Sheet 1 of 4   3,990,875
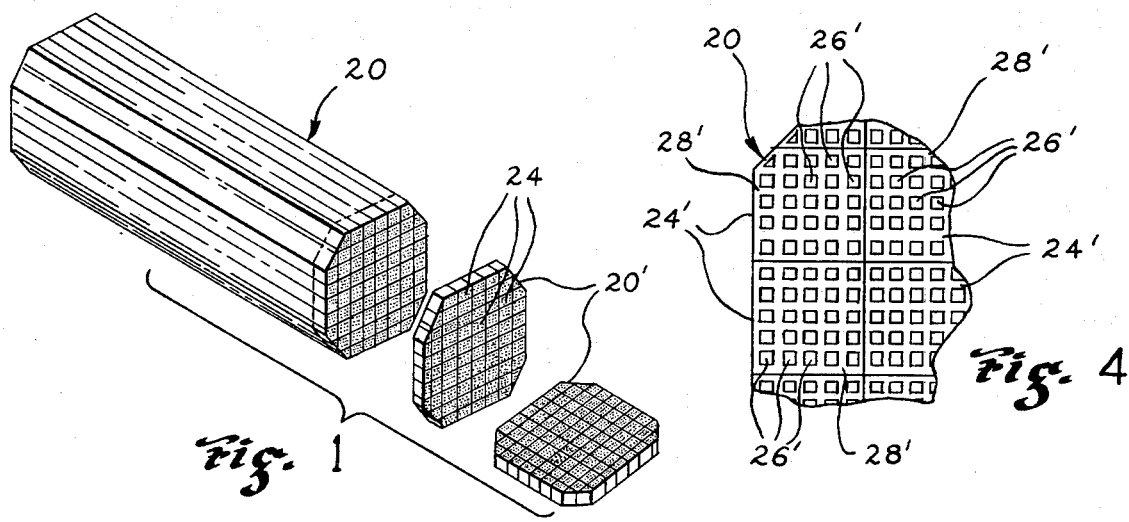
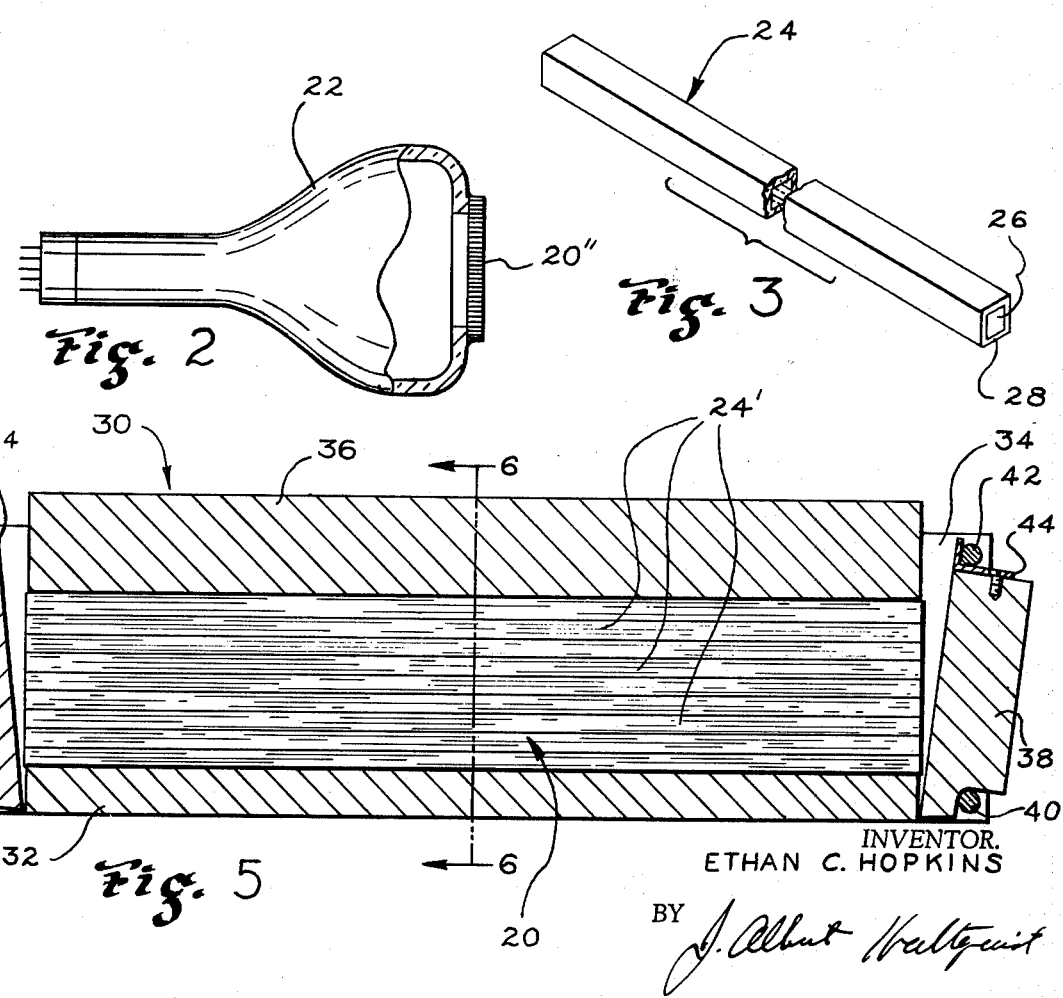
INVENTOR.
ETHAN C. HOPKINS
BY J. Albert Waltquist
ATTORNEY

METHOD FOR MAKING FUSED FIBER ENERGY-CONDUCTING DEVICES

The present invention relates to the manufacture of fused fiber energy-conducting structures and has particular reference to improvements in method and apparatus for making fused glass fiber bundles, face plates and analogous devices which are impervious to air and gases.

In the field of this invention there is a need not merely for vacuum tightness in fiber face plates and the like but for the attainment of such permanence of their imperviousness to air and gases that subsequent working of the devices (e.g. cutting, grinding and polishing of their edges and faces, heating and fusing to electron tube envelopes and the like) will not induce outgassing of the glasses from within the mass of the face plate or otherwise adversely affect their vacuum integrity.

The terms "impervious to air and gases" and "vacuum tightness" used herein are to be interpreted as being synonymous. Both such terms are intended to refer to a condition where the subject fiber optical devices are capable of withstanding, without leaking, air and gas pressures of atmospheric and greater force or at least the equivalent of the recognized external force which is exerted upon evacuated electron tube envelopes and the like.

While it is acknowledged that the prior art offers a variety of schemes for achieving vacuum tightness at least in portions of bundles of fused glass fibers, it has been found that current technqiues in this phase of the fiber optics art are lacking the degree of perfection required for reliably achieving vacuum integrity and especially permanence thereof.

Accordingly, it is an object of this invention to provide improvements in the art of manufacturing vacuum tight fused glass fiber bundles and devices formed therefrom.

Another object is to achieve the foregoing in a simple, economical and reliably duplicable operation; and Still another object is to achieve permanent imperviousness to air and gases in such as the aforementioned articles and, conjunctively, to provide improved apparatus and method for accomplishing the same.

To attain the aforesaid objects and others which may appear from the following detailed description in accordance with principles of my invention, I bundle in side-by-side parallel relationship with each other a number of light-conducting glass fibers and apply a high compressing force to the bundle during one stage of a carefully scheduled and executed heating cycle.

As light-conducting fibers, the present invention contemplates the use of a type recognized in the art as comprising a glass core of one preselected index of refraction having a fused relatively thin cladding of glass of a lower refractive index than that of the core. The fibers may each embody a plurality of such core and cladding combinations all fused together as a unit which is commonly referred to as a "multifiber". The fibers are generally but not necessarily quite flexible. In instances where multifibers are used herein, they may be relatively inflexible but generally proportionately long and thin. Along with the aforementioned forms of optical fibers there may also be interposed clad or unclad glass fibers or similar components at least portions of which have exceptionally high coefficients of absorption for heat and/or light energy.

The aforementioned heating cycle includes preheating the bundle of fibers gradually (e.g. at a rate of approximately 350°/hr.) from room temperature to a temperature of about 200° below the point at which the glasses are of substantially equal viscosity, which point will be referred to hereinafter as the softening point of the glasses. During the latter portion of this stage of the cycle the glasses begin to outgas. Oxidation of foreign matter within the bundle and dehydration of the glasses accordingly takes place and gases emitted from the bundle are continually evacuated from the environment thereof.

In continuing toward achieving complete outgassing and dehydration of the fiber glasses within the evacuated environment and thermal equilibrium in the bundle, the bundle is continued to be increasingly heated to at least a very few (e.g. 5°-10°) degress of its softening point. This second stage of the heating cycle is effected relatively slowly (e.g. at a rate of approximately 230°/hr.) to provide adequate time for complete outgassing and the attainment of an isothermal condition throughout the bundle especially upon reaching said softening point of the glasses. During the next few (e.g. 10-15) minutes, the temperature of the bundle is held approximately at the softening point of its glasses. At the same time, a compressing force reaching approximately five thousand pounds per square inch is applied gradually to the bundle. This causes the outgassed and heat softened fibers to assume a tightly fused interfitted relationship with each other wherein previously existing interstices between the fibers and porosities within the fibers per se and/or other irregularities such as bubbles in the glasses are closed and fused.

Sudden application of the high compressing force is avoided to prevent undue distortion and/or self shearing action on the fibers by relative movement therebetween during compaction of the bundle.

Still within the evacuated environment a third stage of the heating cycle establishes permanent sealing of the fluid bundle. This stage comprises the step of increasing the temperature of the bundle to a point considerably above that to which it, when finished, and/or components formed therefrom are required to be subjected during subsequent working thereof. A temperature of approximately 40° to 50° above the range of the softening points of the bundle glasses is appropriate for this purpose. This increase in temperature of the bundle is effected gradually over approximately the first 15 minutes of the aforementioned total period of 45 minutes so as to maintain an isothermal condition throughout the bundle at all times. Otherwise, the existence of thermal gradients would produce varying hydrostatic pressures within the compressed bundle tending to cause relative movement to take place between the heat softened fibers.

It will be noted that the increase from zero compression gradually to the ultimate compressive force upon the bundle is effected prior to the last mentioned increase in temperature thereof. Thus, all relative movement between the fiber glasses caused by their being required to assume somewhat different shapes during compaction of the bundle takes place at approximately the softening point thereof whereat, as it is recognized in the art, fusion of compatible glasses will take place without appreciable adverse affect upon light-conducting properties of the optical fibers. At the higher temperature used to effect sealing and permanence of vacuum tightness, relative movement between fibers of the bundle is negligible, if not nil, and it has been found that under such conditions the tendency for the fiber glasses to distort, devitrify, diffuse or otherwise become adversely affected is avoided.

Following such sealing of the fiber bundle its temperature, with the compressing force held constant, is gradually lowered to approximately 100° below the softening point of its glasses over a period of time sufficient to substantially avoid the occurrence of substantial thermal gradients in the bundle. A time interval of approximately 20 minutes has been found to be appropriate. Thereafter, the compressing force is completely released at any desired rate and the bundle annealed to prevent the occurrence of internal stress and/or strain therewithin whereupon it is cooled to room temperature.

According to one aspect of the present invention a fiber bundle of from 4 to 12 inches long and approximately 2 inches square may be compressively heat sealed as described above and subsequently cut transversely into sections whose lengths are determined according to the thicknesses desired of face plates or analogous devices intended to be formed therefrom. It should be understood, however, that within recognized limitations fiber bundles of any desired size and shape may be processed according to principles of the present invention.

An embodiment of apparatus used to effect processing of bundles of optical fibers according to the above-outlined procedure is illustrated in the drawing presented herewith and will be described in detail hereinafter.

The invention will be more fully understood by reference to the following detailed description and accompanying drawing.

In the drawing,

FIG. 1 illustrates, in perspective, a fused vacuum tight bundle of optical fibers formed according to principles of the present invention with a number of platelike sections sliced from one end thereof;

FIG. 2 is a view in elevation and partly in cross-section of an electron tube envelope illustrating the usefulness of fused fiber optical sections of the type shown in FIG. 1;

FIG. 3 illustrates in perspective a basic form of optical fiber contemplated for use in the fabrication of fused fiber optic bundles such as that depicted in FIG. 1;

FIG. 4 is a greatly enlarged fragmentary end view of the bundle;

FIG. 5 is a longitudinal cross-section of means for supporting a bundle of optical fibers during processing thereof according to the invention;

Figures 6, 7:
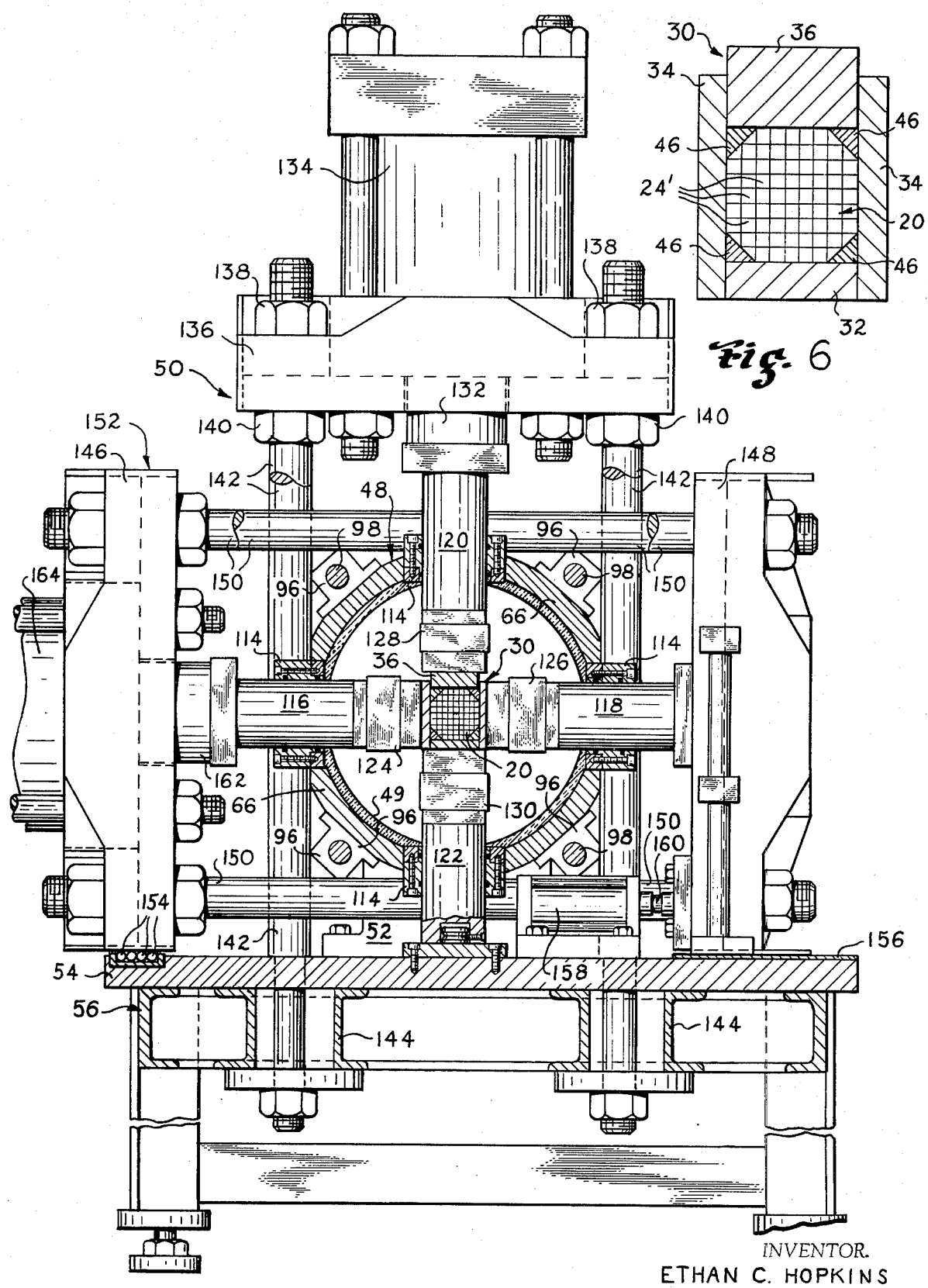
FIG. 6 is a transverse cross-sectional view of said supporting means taken along line 6—6 of FIG. 5.
FIGS. 7 and 8 are vertical and horizontal cross-sectional views respectively of a form of apparatus useful in carrying out the process of the invention.

Referring now to the drawing, FIG. 1 depicts a fused vacuum tight fiber optical bundle 20 which is exemplary of the general type of structure formed according to principles of this invention and from which vacuum tight plates 20' may be cut generally as illustrated. Such plates 20' are, for example, used as fiber optic light-conducting faces 20'' of cathode ray tube envelopes 22 and analogous devices substantially as illustrated in FIG. 2. As it is recognized in the art, certain operations are required to be performed on plates 20' such as cutting the same to desired peripheral shapes and sizes, grinding and polishing one or both faces thereof and fusion to the tube envelopes 22. The latter operation in particular, which requires heating of at least marginal portions of the plates 20' to fusing temperature has, heretofore, lead to troublesome problems involving outgassing of the fiber glasses, distortion of outer fibers of the plates and most disturbingly an attending introduction of gas leaks.

While various steps have been taken heretofore in the direction of achieving vacuum tightness in this phase of the fiber optics art, the present invention, as already mentioned, aims not only to achieve perfection in vacuum tightness of articles such as bundles 20 and plates 20' per se but such permanence of their vacuum tightness that the integrity thereof is unimpaired during their installation and subsequent use.

The present invention substantially eliminates current scrap yield and obviates the need for salvage operations in the field with the result of constructional perfection with exceptional economy.

An optical fiber 24, typical of one type which may be used in the fabrication of vacuum tight fused bundles 20, is illustrated in FIG. 3. Fiber 24 comprises core 26 of glass having one refractive index surrounded by relatively thin cladding 28 of glass having a lower refractive index than that of core 26. Core and cladding glasses may consist respectively of flint and crown, lanthanum borate and borosilicate or other well-known similarly compatible glasses.

Typical of such glasses and exemplary of those actually used and tested in a practice of this invention are a lanthanum borate core glass having a softening point of approximately 723° C, expansion coefficient of 68 × $10^7/°$ C and refractive index of 1.81 with a borosilicate cladding glass having a softening point of approximately 716° /C, expansion coefficient of approximately 47 × $10^7/°$ C and refractive index of 1.48. These glasses characteristically have approximately equal viscosity at their nearly equal softening points and, accordingly, are ideally suited for processing according to the practice of this invention particularly for the following reason:

When compressed at a temperature within the range of their softening points as will be described hereinafter, the aforementioned exemplary glasses retain substantially their initial core to cladding thickness ratios regardless of the extend to which they may be required to assume different shapes during compaction thereof. While the following description will be based upon use of these glasses, it will become apparent to those skilled in the art that various other similarly compatible glasses may be used with equal facility.

Several fibers 24 may, of course, be bundled together, fused and drawn to form multifiber units each having a relatively large number of very small cores individually optically insulated by the fiber claddings thereof. Multifibers are well known and commonly used in the art and are illustrated as being employed herein to form the structure of bundle 20, FIGS. 1 and 4. As illustrated best in FIG. 4, each multifiber 24' comprises several cores 26' separated from one another by cladding material 28'.

According to one aspect of the present invention, a number of mulitfibers 24' of equal length are stacked in aligned parallel side-by-side relationship with each other as compactly as possible within a channeled die 30 to form bundle 20 substantially as illustrated in FIGS. 5 and 6. Bundle 20 may be wrapped or the die lines with gold foil or an equivalent material (not shown) which, under glass fusing and higher temperatures, will prevent possible adhesion of the fiber glasses to die 30.

Die 30 comprises base 32 and sides 34 which form the elongated channel in which multifibers 24' are placed. Platen 36 is positioned upon the top of bundle 20 of fibers 24'. The platen is closely slidably fitted between sides 34 of die 30 and, as it will become apparent hereinafter, it is used to compress bundle 20 when high pressure is applied thereto.

Opposite ends of die 30 are each provided with a gate 38 (see FIG. 5) arranged to pivot against pin 40 to open and closed relationship with opposite ends of the channel which contains multifibers 24'. Gates 38 normally assume the open position shown in FIG. 5 so as to permit evacuation of air and gases from bundle 20 during early stages of the previously mentioned heating cycle used to ultimately heat seal and achieve permanent vacuum tightness of bundle 20. Pins 42 and catches 44 prevent gates 38 from falling away from their respective ends of die 30. Die 30 may be constructed entirely of stainless steel.

Along each edge of the foil wrapped or unwrapped bundle 20 triangular corner pieces 46 (see FIG. 6) are placed to give bundle 20 a generally octagonal shape. Principally, the corner pieces 46 are provided so that the uppermost pair thereof prevent adjacent portions of the inner surfaces of sides 34 from becoming contaminated during heating by residue accumulating thereon from the aforementioned foil wrapping or from the fiber glasses themselves in the event that a foil wrapping is not used. Thus, plate 36 is uninhibited in its sliding movement into die 30 during subsequent compression of bundle 20. Corner pieces 46 also prevent heat softened glasses of bundle 20 from moving (i.e. extruding or forcing the foil wrapping into the slight clearance between platen 36 and sides 34 of die 30).

Figure 8:
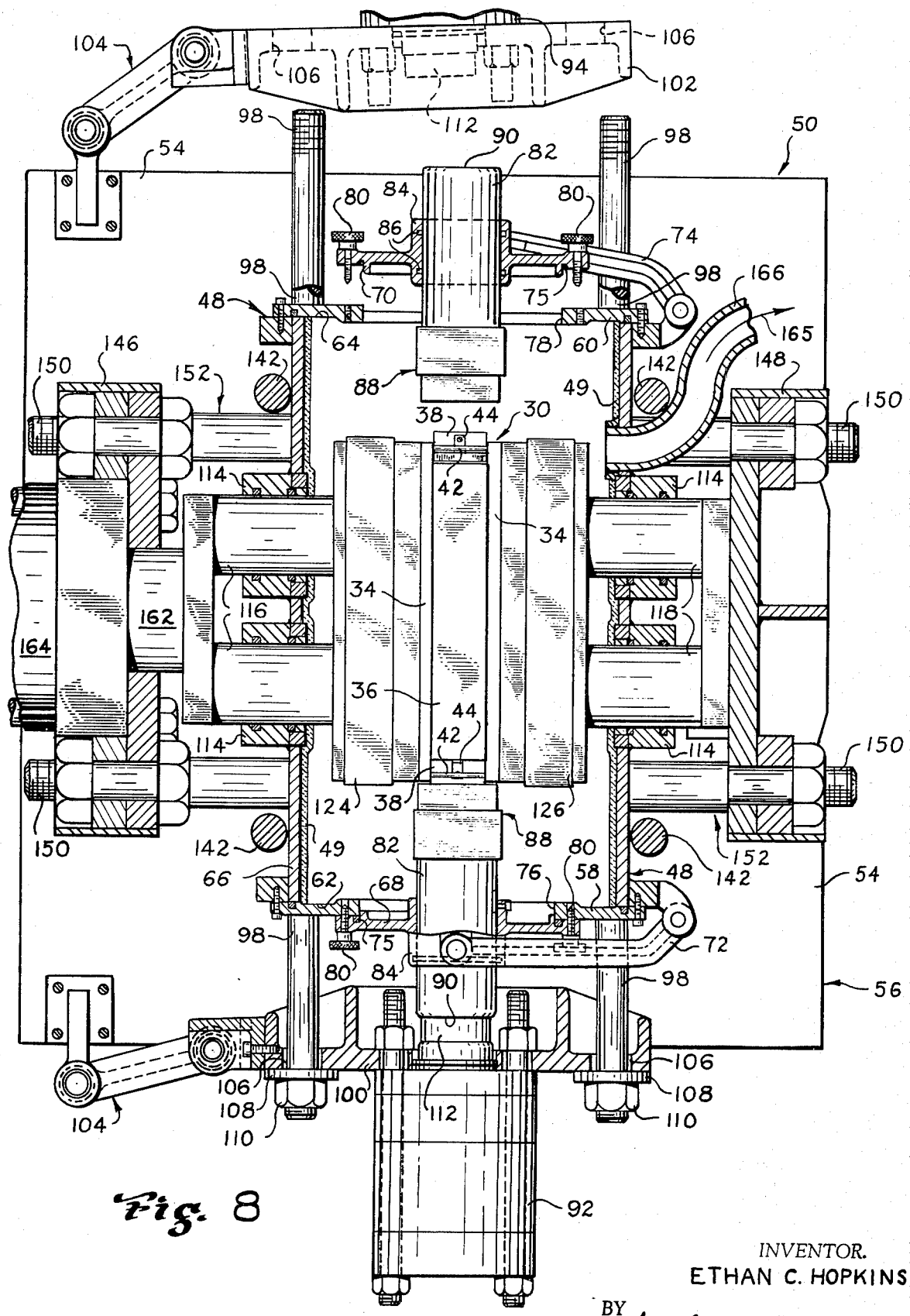

Die 30 with multifibers 24', corner pieces 46, platen 36 and gates 38 all in place is positioned within furnace 48 of press 50 illustrated in FIGS. 7 and 8. Therewithin it is subjected to the aforementioned carefully scheduled and executed heating cycle during a critical stage of which it is subjected to a high compressive force.

Furnace 48 is fixedly supported by one or more blocks 52 (FIG. 7) horizontally upon top plate 54 of base 56. It is of cylindrical configuration having centrally apertured end plates 58 and 60 (FIG. 8) bolted and peripherally sealed in gas tight relationship to opposite ends 62 and 64 respectively thereof and is lined internally with heat insulating material 49.

Hinged to the cylindrical body 66 of furnace 48 are doors 68 and 70 (FIG. 8) pivotally mounted to hinge arms 72 and 74 respectively by means of which the doors may be selectively swung toward and away from end plates 58 and 60. Doors 68 and 70 are adapted to close flatly against end plates 58 and 60 respectively and form a gas-tight seal around openings 76 and 78 therein. Gasketing 75 is used in recognized fashion for effecting the seal while keeper screws 80 releasably hold the doors in said closed, sealed relationship.

Carried by each door is a plunger 82 slidably mounted in a centrally disposed bearing section 84 of the door. O-ring seals 86 render the section 84 and plunger 82 combination gas-tight while permitting longitudinal sliding movement of the plungers coaxially toward and away from each other when doors 68 and 70 are closed.

Inner ends of plungers 82 each carry electrically operated heating blocks 88 which, as it will become apparent hereinafter are used for the dual purpose of heating and applying pressure to respective opposite ends of die 30 when ends 90 of plungers 82 are acted upon by fluid operated air or hydraulic cylinders 92 and 94. Only a fragmentary portion of cylinder 94 is shown in FIG. 8. It is, however, identical to cylinder 92.

The supporting structure for cylinders 92 and 94 comprises blocks 96 (FIG. 7) fixed to the outer side of furnace body 66 through each of which a rod 98, threaded at each of its opposite ends, is extended parallel to the axis of furnace body 66 and exteriorly thereof. Cylinders 92 and 94 are bolted to rigid plates 100 and 102 respectively, each of which is heavily webbed to prevent distortion thereof under applied high pressure (see FIG. 8). Plates 100 and 102 are each hinged by linkages 104 from top plate 54 of base 56 in such manner that they may be swung toward and away from their respectively adjacent ends of rods 98. Openings 106 in each of plates 100 and 102 are adapted to receive rods 98. When in use, plates 100 and 102 are fitted over the ends of rods 98 and backed up by washers 108 and stop nuts 110 in the manner shown with regard to plate 100. Thus, ram 112 of each cylinder 92 and 94 is brought into coaxial relationship with its respective plunger 82.

Actuation of cylinder 92 causing ram 112 thereof to advance thus moves plunger 82 and heating block 88 against gate 38 of die 30. With plate 102 positioned similarly to plate 100 (FIG. 8) and backed up by similar washers 108 and nuts 110 (not shown) it can be seen that simultaneous operation of cylinders 92 and 94 will apply an axial compressing force on die 30.

Extending laterally in horizontal and vertical coordinates through bearing sleeves 114 which are secured to furnace body 66, are pairs each of horizontal plungers 116 and 118, a pair of vertical plungers 120 (FIG. 7) and a similarly shaped pair of vertically extending but immovable stands 122. Only one of each pair of plungers 120 and stands 122 is shown in FIG. 7, the others thereof being disposed forwardly of the cross-section of furnace 48 as it is shown in FIG. 7 and accordingly out of the picture. Each bearing sleeve is provided with gaskets to seal the plunger gas tight in its sleeve.

Within furnace 48, elongated electrically operated heating blocks 124, 126, 128 and 130 (FIG. 7) are attached to corresponding ends respectively of pairs of plungers 116, 118, 120 and the pair of stands 122. Heating blocks 124 and 126 extend along the full lengths of sides 34 of die 30. Heating block 128 similarly extends along the full length of platen 36 and heating block 130 extends along the full length of bottom 32 of die 30. It will be apparent that electrical heating elements in the form of wire coils or rods of high electrical resistance (not shown) are disposed internally of each of the heating blocks mentioned herein and that electrical connections, also not shown, are provided from the heating elements to a source of energizing power.

Stands 122 are fixed to top plate 54 of base 56 and heating block 130 thus provides a fixed table upon which die 30 is rested (see FIG. 7).

Compression of fiber bundle 20 is effected by platen 36 being forced downwardly thereagainst by heating block 128 under the action of forced downward movement of plungers 120 by ram 132 of fluid operated air or hydraulic cylinder 134. In FIG. 7 it can be seen that cylinder 134 is bolted to a heavily reinforced webbed plate 136 which, in turn, is secured by pairs of opposing lock nuts 138 and 140 to the threaded uppermost ends of vertically disposed supporting rods 142. Lowermost end sections of rods 142 are shouldered against top plate 54 of base 56 and extended through framework 144 wherein they are securely anchored against longitudinal movement.

Heavily reinforced webbed plates 146 and 148 interconnected by rods 150 comprise carriage 152 which straddles furnace 48. Plate 146 rests upon roller bearings 154 and plate 148 rests upon slideway 156. Bearings 154 and slideway 156 are fixed to top plate 54 of base 56 (see FIG. 7). Friction between plate 148 and slideway 156 prevents free sliding of carriage 152 on plate 54 so that the carriage will normally maintain a fixed position of lateral adjustment relative to furnace 48. Carriage 152 is laterally slidable on top plate 54 and is guided in its direction of movement by horizontal plungers 116 and 118 which extend through bearing sleeves 114 in furnace 48. Controlled sliding movement of carriage 152 is effected by operation of fluid actuated cylinder 158. Cylinder 158 is secured to top plate 54 and has the exterior end of its piston rod 160 attached to plate 148 (see FIG. 7).

Plungers 118 carrying heating block 126 are fixed to plate 148 of carriage 152 while plungers 116 are attached to ram 162 of fluid operated air or hydraulic cylinder 164. Cylinder 164 is bolted to plate 152 and when actuated, it forces heating block 124 against die 30. Accordingly, it can be seen that through the multiple rod 150 and dual plate 146–148 linkage, pressure applied to heating block 124 by cylinder 164 is balanced by equal and opposite pressure upon die 30 through heating plate 126 and rod 118. In other words, the arrangement of carriage 152 acts as a fluid operated clamp.

From the drawing (FIGS. 7 and 8) and the above description thereof it can be seen that at no time during the application of pressure upon die 30 by high pressure cylinders 92, 94, 134 and 164 is there any force exerted directly upon stationary furnace 48. All forces resulting from high pressure compression of fiber bundle 20 in die 30 are taken up longitudinally by rods 98, 142 and 150 of high tensile strength. These rods are in all cases parallel to the direction of forces applied by their respective cylinders.

Operation of press 50 takes place as follows:

1. At least one of plates 100 or 102 is released from rods 98 and swung away from its adjacent end of furnace 48;
2. The respectively adjacent door 68 or 70 is released and also swung away from said end of the furnace;
3. Die 30 containing fiber bundle 20 with platen 36 in place thereon is directed longitudinally through the exposed opening 76 or 78 onto heating block 130 within furnace 48;
4. Carriage 152 is adjusted laterally by actuation of cylinder 158 (FIG. 7) to center die 30 relative to the axis of ram 132 of cylinder 134;
5. Both doors 68 and 70 are closed and locked with keeper screws 80 (this renders furnace 48 gas-tight);
6. Plates 100 and 102 are fitted over rods 98 and backed up by washers 108 and nuts 110;
7. Furnace 48 is evacuated of air and gases as indicated by arrow 165 by means of vacuum line 166 (see FIG. 8) leading to vacuum pump (not shown) which may comprise any one of the many recognized forms thereof;
8. Electrically operated heating blocks 88, 124, 126, 128 and 130 are energized to heat fiber bundle 20 by conduction through die 30 according to the aforementioned planned heating cycle (means for thermostatically controlling the temperatures applied to die 30 and fiber bundle 20 and for programming the heating cycle are not illustrated or described herein since various forms thereof which are applicable to the present apparatus are commercially available and would be readily recognized by anyone skilled in the field involving glass heat treating methods and apparatus.
9. Fiber bundle 20 is compressed by simultaneous actuation of all cylinders 92, 94, 164 and 134 whereupon cylinders 92 and 94 force heating blocks 88 one against each end (gates 38) of die 30, cylinder 164 forces heating blocks 124 and 126 against their respective sides 34 of die 30 and cylinder 134 forces heating block 128 against platen 36.

Figure 9:
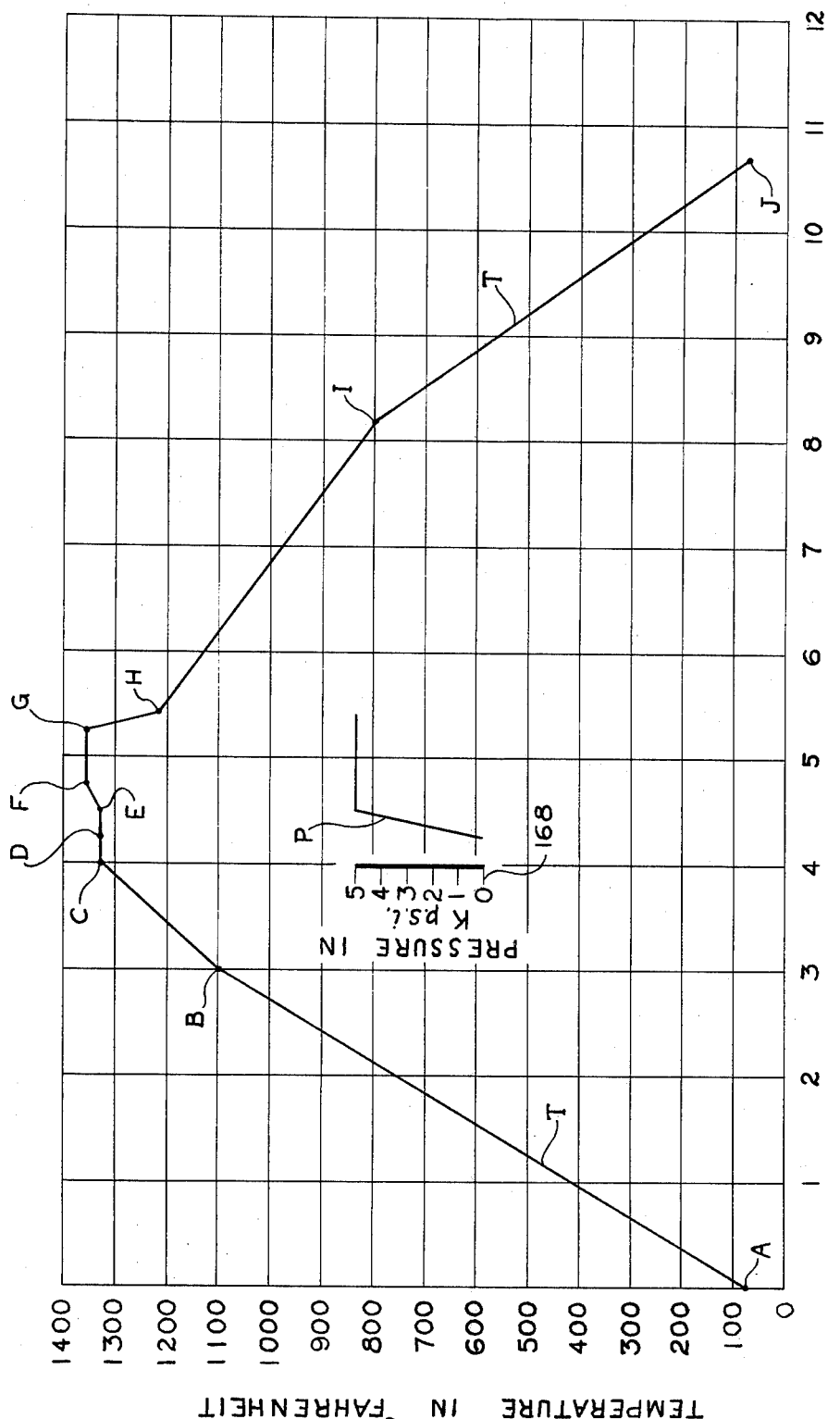
FIG. 9 graphically represents details of a processing cycle useful in understanding the present invention.

In conjunction with the introductory portion of the specification, details of the heating and compressing cycle mentioned therein are illustrated graphically in FIG. 9. Therein, line T illustrates the temperature-time cycle of the present operation and superimposed upon the graph is line P which represents pressure applied to fiber bundle 20 as against the same scale of "Time In Hours" as is used to illustrate timing of various stages of heating (line T). Actual pressure applied within bundle 20 is however, indicated by the separate scale 168 labeled from 0 to 5 in thousand pounds per square inch (Kp.s.i.).

Lines T and P are representative of a typical heating and pressure cycle used according to principles of the present invention. The illustrated heating-pressure cycle (lines T and P) is based upon use of the aforementioned exemplary lanthanum borate core and borosilicate cladding glasses in the fabrication of multifibers 24' of bundle 20. While the instant drawing and description illustrates one mode contemplated for carrying out the invention, it should become readily apparent that combined heating and pressure cycles for other preselected fiber glasses would differ only in degree and not in principle. Thus, it is left well within the skill of an artisan using the present teachings to practice the invention after having selected fiber core and cladding glasses which have substantially equal viscosity at their softening points.

With die 30, containing fiber bundle 20, positioned in furnace 48 of press 50 as outlined above in steps (1)–(7), heating blocks 88, 124, 126, 128 and 130 are energized to raise the temperature of bundle 20 gradually from point A at or near (room temperature) to a temperature of approximately 1100° F (point B. FIG. 9) over a period of time of approximately 3 hours. This will be referred to hereinafter as the preheating stage of heating cycle T. During the latter portion of this stage of the heating cycle, e.g. between 800° and 1100° F, oxidation of dust particles and/or other organic foreign matter happening to exist in bundle 20 begins to take place along with dehydration and general outgassing of the glasses of bundle 20.

As already mentioned, furnace 48 is continually evacuated during the cycle represented by FIG. 9 so that gases emitted from bundle 20 are removed from the immediate environment thereof. Such removal of the emitted gases is facilitated by gates 38 of die 30 being open as described hereinabove until heating blocks 88 are brought thereagainst during subsequent compression of bundle 20.

From point B(FIG. 9) bundle 20 is increasingly heated over a period of approximately 1 hour to within the range of the softening points of the fiber glasses, i.e. 1330° F (point C, FIG. 9). Substantially complete outgassing and thermal equilibruim (i.e. an isothermal condition) of the bundle glasses is accomplished during this second stage of heating. To assure such, however, bundle 20 is held at said temperature for a few (approximately 15) minutes prior to the application of a compressing force thereupon.

At point D (FIG. 9) all cylinders 92, 94, 164 and 138 are actuated as described in step (9) of the operation of press 50. With the temperature of bundle 20 held substantially constant over an additional period of from 10 to 20 minutes (e.g. from point D to point E, FIG. 9) pressure P is gradually increased from 0 to 5 Kp.s.i. and held thereat. Cylinder 134 thus forces heating block 128 against platen 36 causing compression of bundle 20. Cylinders 92 and 94, in simultaneously applying equal pressure against opposite ends (gates 38) of die 30 prevent distortion of bundle 20 its longitudinal meridians. At the same time the arrangement of cylinder 164 with carriage 152 acting as a fluid operated clamp holds, at the same pressure, the sides 34 of die 30 fixed against distortion. Pressure thus being applied equally to the sides, opposite ends and top of die 30 with platen 36 alone acting to compress bundle 20 causes interstices, bubbles and other porosities or voids around and/or within the heat softened fibers 24 or 24' to become closed and fused; outgassing having previously taken place.

The gradual increase in pressure from 0 to 5 Kp.s.i. (from points D to E, FIG. 9) prevents sudden movement of the fibers into tightly fused relationship with each other. Thus, undue distortion and/or possible self shearing action on the fibers is avoided and the optical properties thereof are not appreciably, if at all, adversely affected.

At point E of line T, with the compressive force of 5 Kp.s.i. held constant, the now fused and fully compacted bundle 20 is rendered permanently vacuum tight by raising its temperature above the softening point of its glasses to point F (1360° F). This increase in temperature is effected over a period of approximately 15 minutes so as to maintain thermal equilibrium in bundle 20 at all times for the reasons already mentioned. Furthermore, at the increased temperature, relative movement between the already fully compacted and fused fibers of bundle 20 and/or their respective core and cladding glasses is negligible, if not nil, thereby avoiding possible distortion, devitrification effects diffusion of one glass into another or other conceivable adversities which might be detrimental to the optical and/or physical properties of bundle 20.

By holding bundle 20 at the high temperature of approximately 1360° F for a period of approximately 30 minutes (i.e. from points F to G, FIG. 9) permanent sealing of bundle 20 is effected.

The step of increasing the temperature of bundle 20 to above its average softening point and holding same under high compressive force (5Kp.s.i.) will be referred to hereinafter as the step of "sealing" bundle 20. The term "sealing" having significance herein as meaning —effecting permanence or integrity of vacuum tightness of bundle 20—.

From point G to point H (FIG. 9) the temperature of bundle 20 is lowered gradually over a period of approximately 10 minutes or a time period of sufficient duration to avoid incurring appreciable thermal gradients in bundle 20. Pressure P is held constant at 5 Kp.s.i. and released only when the temperature of bundle 20 reaches point H where the glasses of bundle 20 have hardened. Point H is shown to be approximately 1220° F.

From point H (1220° F) to point I (about 800° F) the temperature of bundle 20 is lowered gradually at a rate of approximately 150° /hour to effect annealing of the glasses thereof in recognized fashion. Thereafter, its rate of decrease in temperature may be accelerated to approximately 300°/hour down to room temperature substantially as shown between points I and J (FIG. 9). The dictates of this latter rate of temperature decrease (i.e. cooling) are only that it not be so rapid as to thermally shock bundle 20.

Die 30 containing the now permanently vacuum sealed bundle 20 is removed from furnace 48 by reversing the steps used to place same in the furnace and bundle 20 is removed from the die.

An important step of the present process is that of heat sealing bundle 20 under high compressive force at a temperature well above that to which it ever need be subsequently heated.

Accordingly, the steps of preheating (from point A to point B, FIG. 9) and annealing followed by cooling (from point H to point J, FIG. 9) may be performed externally of furnace 48 in portable furnaces thereby reducing the time required for use of press 50 to a little more than 2 hours (from point B to point H, FIG. 9). Such portable furnaces may be moved into position adjacent furnace 48 of press 50 to deliver preheated bundles of fibers such as 20 contained in dies such as 30 and to receive the same after release of pressure thereupon (point H, FIG. 9). Preheating and annealing furnaces per se are commonly used in the field of this invention and accordingly are not illustrated herein. Portability thereof requires only that a suitable stand movable on casters or slides be provided for moving same up to and away from furnace 48.

It will be appreciated that other modifications are possible based on the teachings provided herein and that all modifications which fall within the claims or within the scope of equivalency thereof are intended to be covered.

I claim:

1. The method of making permanently vacuum tight fused bundles of glass fibers comprising the steps of bundling in parallel side-by-side relationship with each other a number of fibers each having at least one core of glass and a surrounding relatively thin glass cladding of preselected relatively high and low refractive index respectively, said core and cladding glasses being further so preselected as to have approximately the same softening points, placing the bundle of said fibers in an evacuated environment and maintaining said environment during the steps of heating said bundle of said fibers gradually to a temperature within the range of said softening points of said glasses, applying a high compressive force to said bundle while at said temperature, increasingly heating said bundle while under said compressive force to a temperature substantially higher than that of said softening points, holding said higher temperature and compressive force substantially constant for a period of time at least sufficient to attain thermal equilibrium thereat in the bundle whereby permanence of vacuum tightness of said bundle is attained, lowering the temperature of said bundle gradually to a point substantially below said softening points of the glasses thereof, and thereafter releasing said compressing force, annealing the glasses of said bundle and cooling same gradually to room temperature.

2. The method as recited in claim 1 wherein following said step of heating said bundle of fibers to said temperature within the range of the softening points of its glasses, said bundle temperature is held thereat for a period of time at least sufficient to effect thermal equilibrium of said bundle and complete outgassing of glasses thereof in said evacuated environment and said high compressive force is thereafter applied gradually.

3. The method as recited in claim 2 wherein said high compressive force is in the order of five thousand pounds per square inch.

4. The method as recited in claim 1 wherein said higher temperature is within a range of from 40° to 50° above said softening points of said glasses.

* * * * *